United States Patent

Erickson

[15] 3,656,673

[45] Apr. 18, 1972

[54] METHOD AND MEANS OF ACCURATELY POSITIONING FILM IN A FILM PROCESSING MECHANISM

[72] Inventor: Glenn D. Erickson, Minneapolis, Minn.
[73] Assignee: Pako Corporation, Minneapolis, Minn.
[22] Filed: Sept. 21, 1970
[21] Appl. No.: 74,011

[52] U.S. Cl. ................................226/2, 226/136, 226/156
[51] Int. Cl. .................................B65h 23/04, B65h 17/10
[58] Field of Search ....................226/2, 9, 134, 136, 156, 169

[56] References Cited

UNITED STATES PATENTS 2,955,821  10/1960  Leonard..............................226/156 X
3,315,862  4/1967  Schwardt..............................226/136

Primary Examiner—Richard A. Schacher
Attorney—John W. Adams

[57] ABSTRACT

This invention is a film feed control for a film advancement mechanism to accurately position a particular film frame for processing by using the film frame location prior to advancement to determine a sequential cycle of film advancement in which each film frame is first advanced a minimum predetermined distance by actual measurement and then, without stopping, is advanced a further distance using a timer to control the end of the film advancement cycle by measuring an increment of time for further film advancement determined for each frame based on frame position prior to the start of the advancement cycle.

11 Claims, 11 Drawing Figures

INVENTOR.
GLENN D. ERICKSON
BY
John W. Adams
ATTORNEY

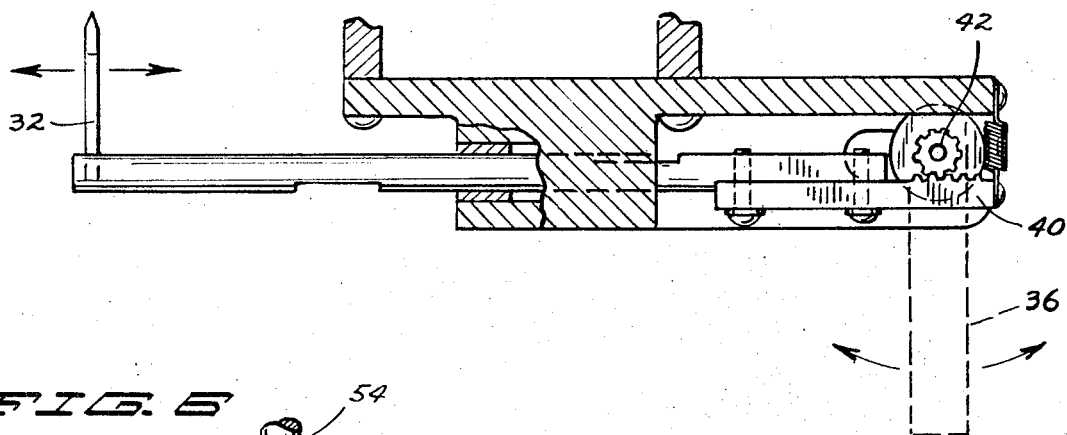
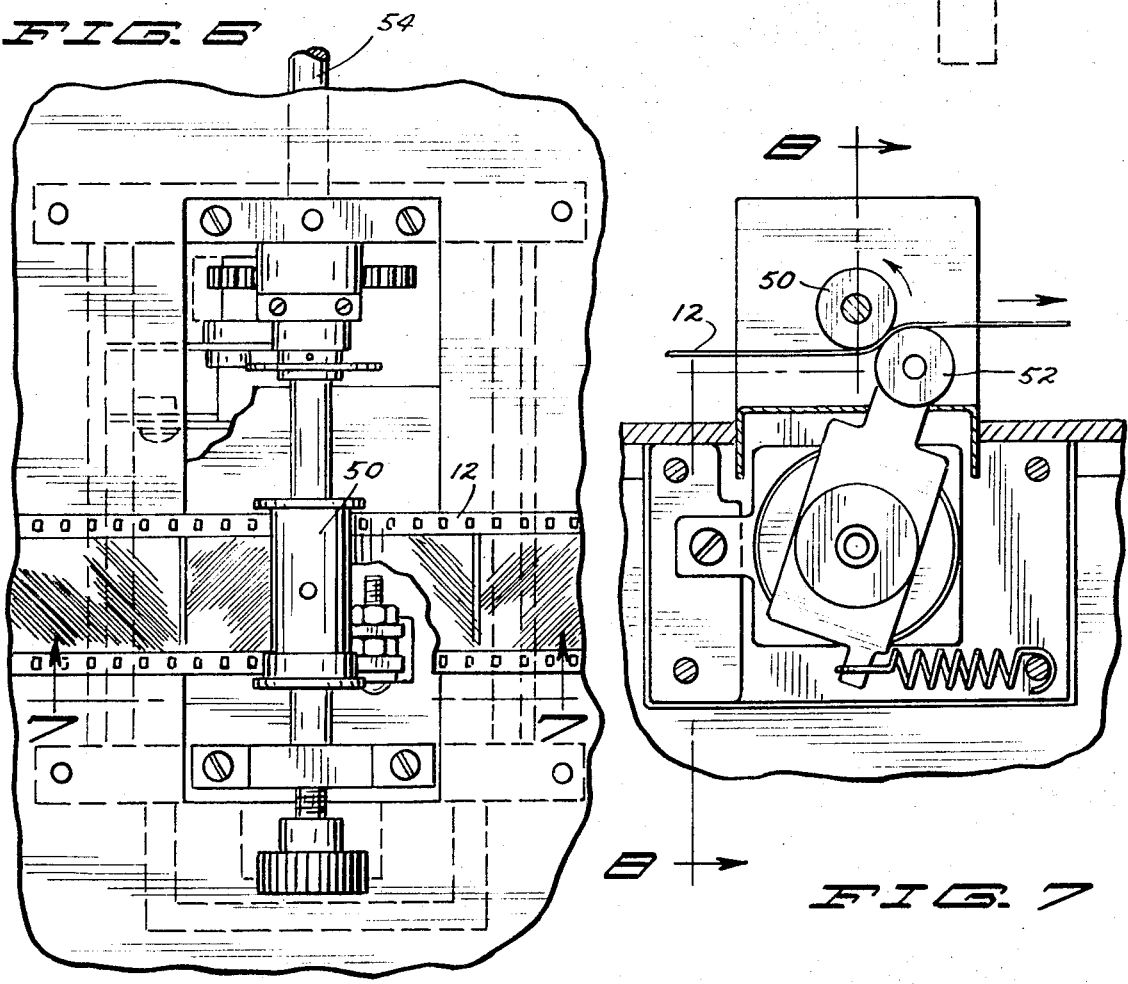

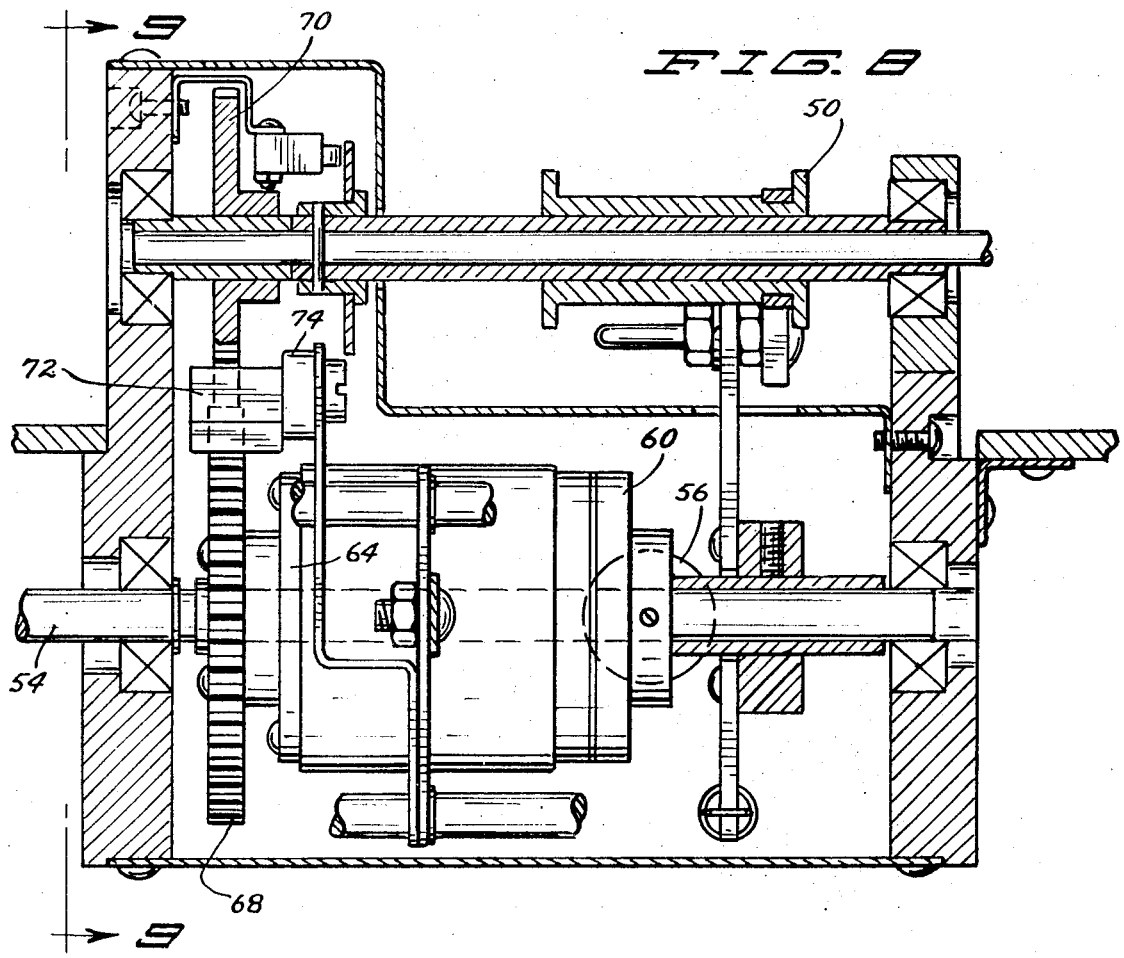
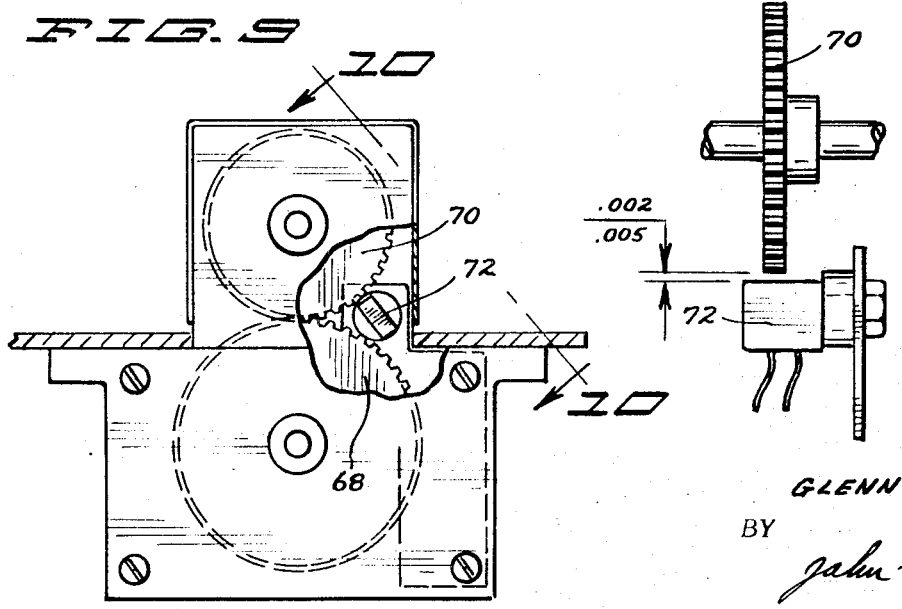

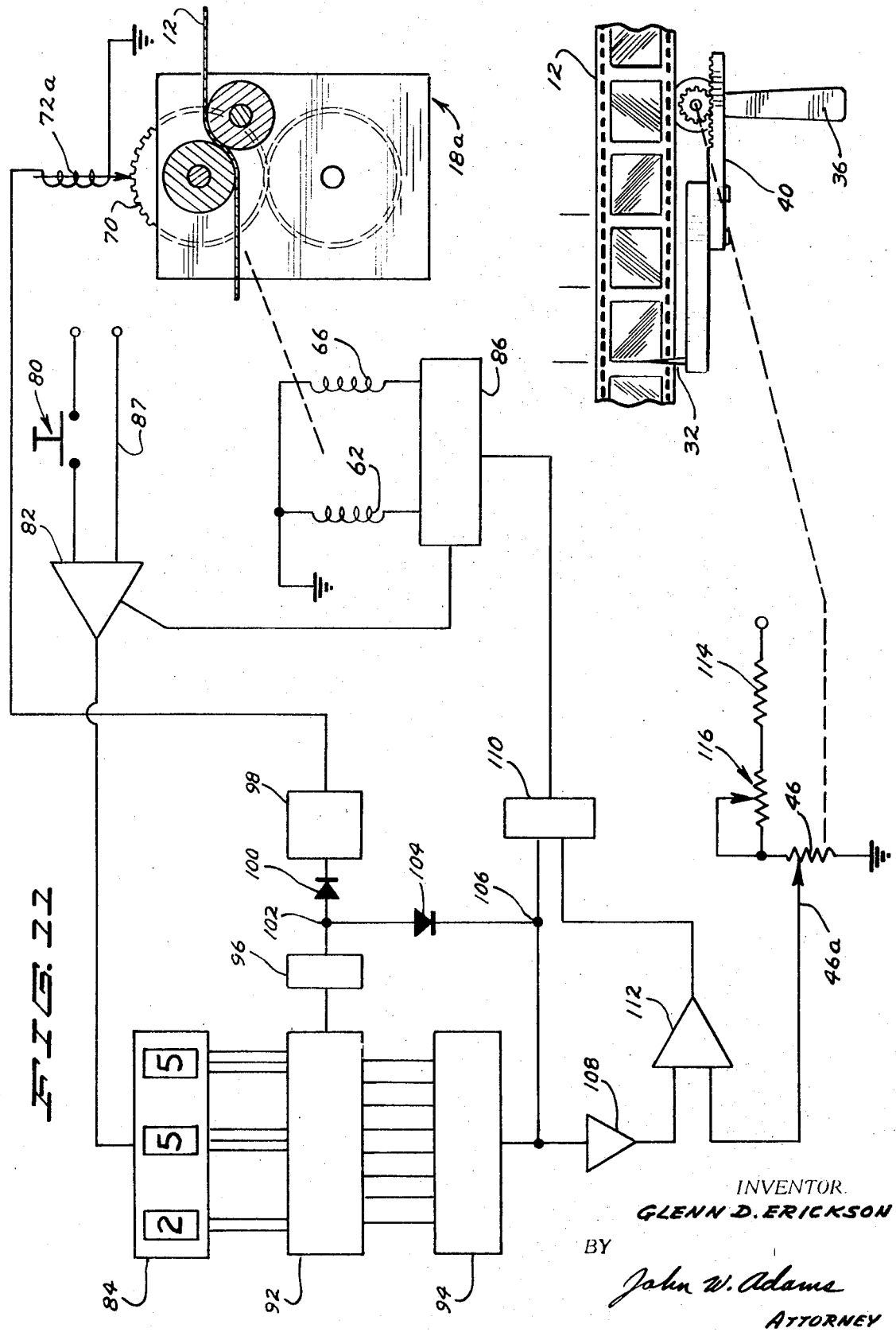

METHOD AND MEANS OF ACCURATELY POSITIONING FILM IN A FILM PROCESSING MECHANISM

This invention relates to a film feed control and a method for accurately positioning a particular film frame for processing in a photographic processing mechanism.

In the processing of photographic films on a commercial scale, it is very important to have a photographic printer which works accurately and efficiently at a high rate of speed. One of the important design problems for a commercial photographic printer is the requirement that each frame of the photographic film be accurately positioned in the printing mechanism while a print is being made. It will be appreciated that for rapid repetition of the printing process from different frames of film, that it is difficult to design a mechanism and control system which will achieve the desired result accurately. Similarly, it is necessary to accurately position film in a film cutter, and my invention will, therefore, find application in a film cutter, as well as in a printer.

This invention is especially adapted for use with 35mm film which has no indicia furnished on the film when it is sold to indicate frame positioning, as does 126 size film which is furnished with a notch on the edge of the film which can be used to operate a cam switch to stop and position film during processing. To achieve accurate frame positioning during processing of 35mm film, it is necessary for either the operator or the machine to determine the actual film frame edge by observation and regulate the mechanism accordingly. Most modern cameras using 35mm film have a stop device in the film winding mechanism so that the frame-to-frame distance for each camera is accurate and consistent. Thus, a manually operated film feed control need be adjusted only once for each roll of film for the majority of the film being processed commercially today. Thus, a manual control will not unduly distract the operator from other decisions which may have to be made concerning the film processing. However, if necessary, the operator can make the manual adjustment for each individual frame with little loss of efficiency.

In the past, several basic systems to obtain registration of film with printing paper have been developed. One system provides that the entire advancement of film from frame-to-frame is controlled by a timing mechanism which controls the duration of film movement and which is set for the correct time by manually positioning a pointer adjacent an edge of the film frame. This mechanism has certain disadvantages in that although the normal operating speed of the advancement mechanism is relatively stable, the start-up time from a rest position fluctuates. Thus, a time measurement system will have inherent inaccuracies, as a result of the inability to accurately predict the mechanism's start-up time. This is a particularly serious disadvantage where 35mm film is used to prepare prints which are a substantial enlargement of the picture. In this situation, any error of frame positioning represents a magnified error of print positioning. In addition, there is a possibility that a portion of the picture could be screened by the enlarger window, and therefore, not printed. Another method of frame positioning provides a manually positioned movable pointer, which is linked to a movable stop contact in a stop switch driven by the film advancement mechanism, said pointer being positioned at a film frame edge prior to advancement thereof. This system has the disadvantage of cumbersome complex mechanical components whereas the state of the art requires electrical control of simple mechanical elements.

My invention provides an accurate positioning of individual frames of film for processing using a sequential cycle of film advancement in which the film is first advanced a predetermined minimum distance which will be uniform for each frame and which is then followed, without stopping, by a time interval advancement which is varied from frame-to-frame to achieve the correct final frame positioning by manual adjustment of a pointer linked to an electronic control circuit. The initial minimum advancement of a measured distance allows the advancement mechanism to achieve its normal and stable operating speed which is advantageous because the distance measured is independent of the advancement mechanism's fluctuations in start-up time. Once this initial film advancement is completed, a further advancement, determined by movement over a variable time interval controlled by the manual positioning of a pointer, will accurately position the individual film frame for printing, since the stabilized operating speed of the printer is relatively constant.

Briefly, the sequential film advancement cycle of my invention is determined by an electronic control circuit which first computes the initial minimum distance measurement by electronically counting a certain number of gear teeth on a gear wheel in the drive mechanism as they rotate past a fixed point. Once the tooth counting circuit determines that the minimum advancement of film has occurred, the variable time advancement circuit becomes operational without the film being stopped. The film advancement then continues a further distance until the increasing voltage output generated by an electronic timer equals the output voltage of a potentiometer, which is adjusted for each frame by the operator's manual positioning of a pointer in registration with an individual film frame edge.

Accordingly, it is a general object of this invention, to provide a method and means for accurately positioning film in a film processing mechanism after a cycle of film advancement.

Yet another object of this invention is to provide a film feed control for a photographic processing mechanism which accurately positions each individual frame of film in the photographic processing mechanism as the film is advanced frame-by-frame therethrough.

A further object of this invention is to provide an electronic control system for a photographic printer which will accurately position individual frames of film in the photographic printer.

A more specific object of this invention is to provide a film feed control for a photographic printer which will provide a sequential cycle of frame-by-frame film advancement wherein each frame is first advanced a uniform minimum distance which is then followed by a further film advancement, without stopping, which is individually controlled, frame-by-frame, by a manually set timer control.

These and other objects and advantages of this invention will be apparent from the following description made in connection with the accompanying drawing wherein like reference characters refer to similar parts throughout the several views, and in which:

FIG. 5 is a detailed sectional view along lines 5—5 of FIG. 3 with some elements omitted.

FIG. 6 is a top view of another portion of a photographic printer embodying my invention along lines 6—6 of FIG. 1.

FIG. 7 is a sectional view along lines 7—7 of FIG. 6.

FIG. 8 is a sectional view along lines 8—8 of FIG. 7.

FIG. 9 is a sectional view along lines 9—9 of FIG. 8.

FIG. 10 is a sectional view along lines 10—10 of FIG. 9.

FIG. 11 is a diagrammatic view of the electrical circuit of the control system.

Figure 1:
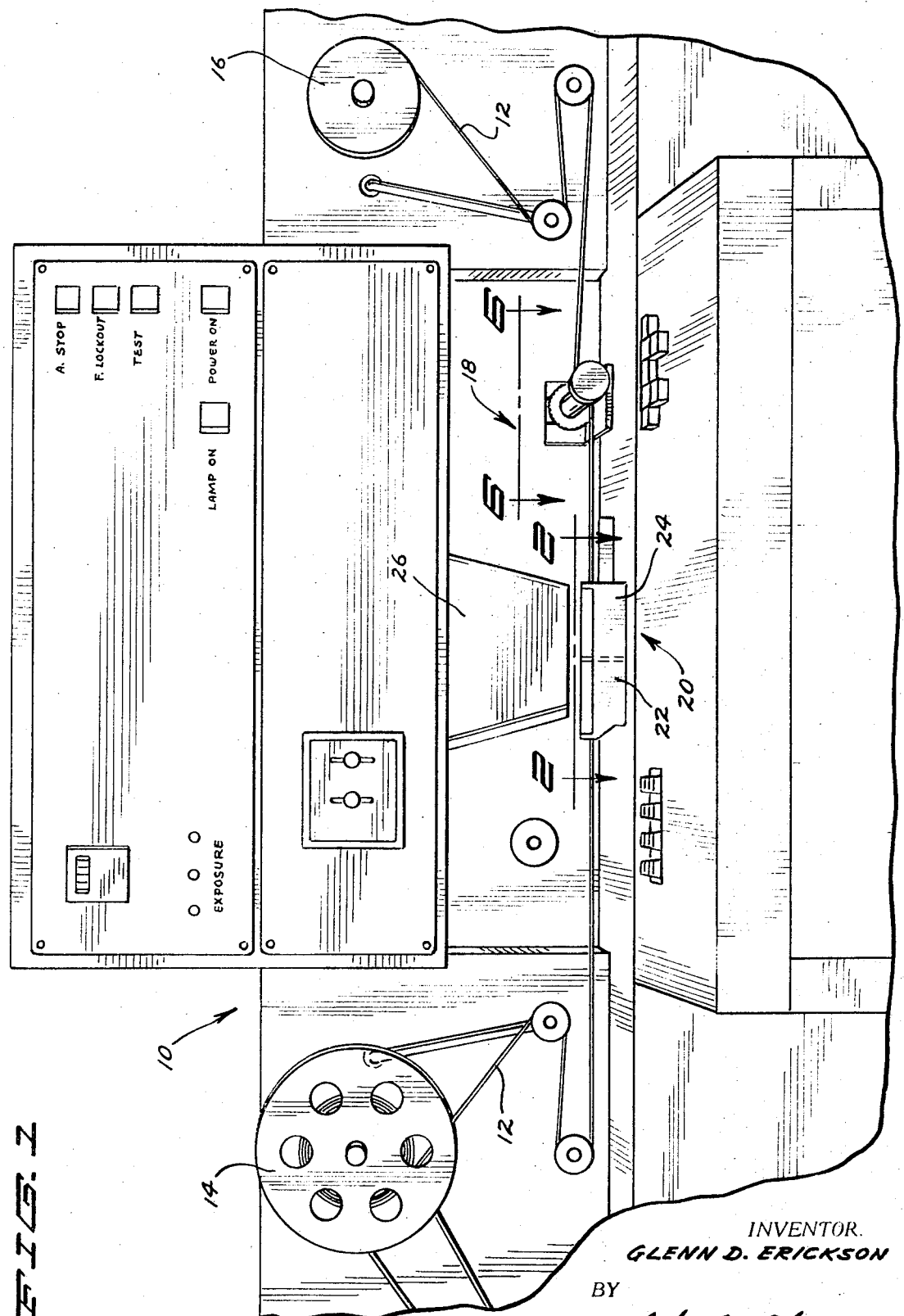
FIG. 1 is a general view of a photographic printer embodying my invention.

Referring now to FIG. 1, a photographic printer is generally designated by reference numeral 10. The printing paper is not shown but is located in a light tight cabinet in the bottom of the printer. The film is generally designated 12 and is transported from feed roll 14 to take-up roll 16 through the printing gate generally designated by reference numeral 20. A film transport mechanism is generally designated 18 and is the power source or prime mover for moving the film frame-by-frame through the printing gate. The printing gate 20 has a preview window 22 and a printing window 24 disposed beneath a light cone 26 which communicates with the light source and light filter elements for controlling the quality of the final printed photographic image.

Figure 2:
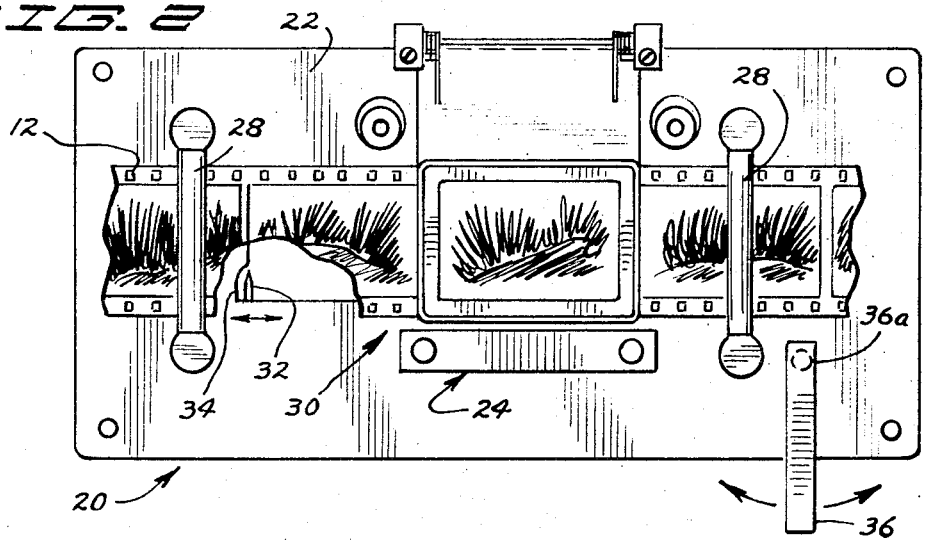
FIG. 2 is a top view of a portion of a photographic printer embodying my invention along lines 2—2 of FIG. 1.
Figure 3:
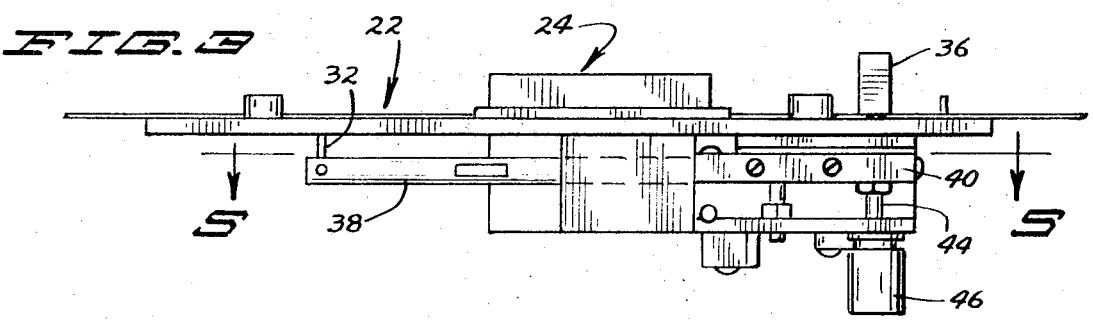
FIG. 3 is a side view of the portion of a photographic printer shown in FIG. 2.
Figure 4:
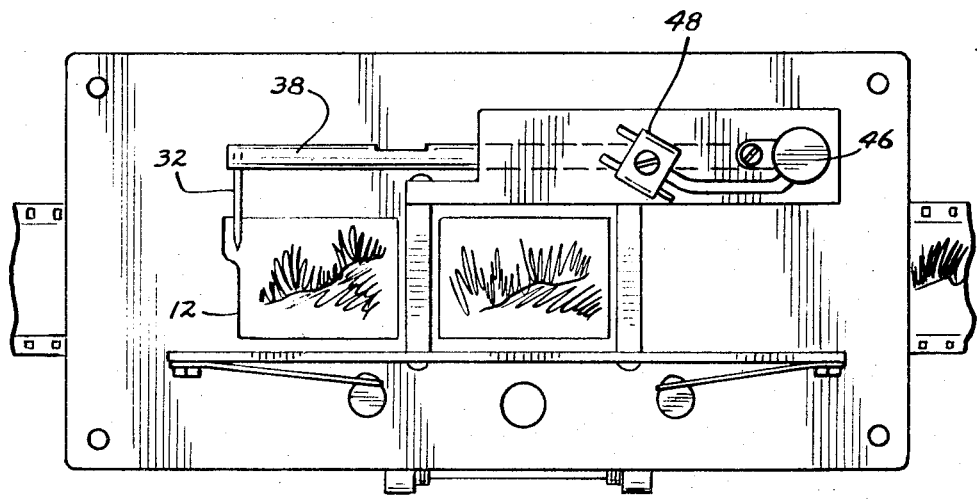
FIG. 4 is a bottom view of the portion of a photographic printer shown in FIG. 2.

Referring now to FIG. 2, the printing gate 20 has film guiding and carrying elements 28 which generally consist of rollers to maintain the film in film guides 30. A pointer is generally designated 32 and occupies a position in a recessed slot 34 in the preview window 22. The operation of the variably positioned pointer is manually controlled by lever 36 which is mounted on the printing gate and pivots about a pivot point 36a. As may be seen in FIG. 3, the pointer 32 is mounted on an arm 38 which extends across the printing gate to a rack 40 as shown in FIG. 5. A pinion gear 42 is mounted on a shaft 44 which connects at one end with the lever 36 at the pivot point 36a. At the other end of the shaft 44 is a potentiometer 46 which is electrically connected with the electronic control mechanism of this printer. As shown in FIG. 4, an electrical connector 48 is provided for the wires leading to the potentiometer.

Referring now to FIG. 6, a film transport mechanism is provided in which a film feed spool 50 is in frictional engagement with a pinch roller 52 to drive the film there between. A drive shaft 54 is connected by a chain or belt with a motor in another portion of the photographic printer and is driven continuously at a constant rate of speed. The shaft 54 extends concentrically through various elements of the mechanism to a gear set 56 which drives a hollow shaft 58 concentrically surrounding the drive shaft 54. The outer shaft 58 drives a clutch 60, which is electrically controlled by means of an internal solenoid 62 shown on the schematic wiring diagram in FIG. 11. The clutch, in turn, is connected through a brake 64 which is electrically controlled by an internal solenoid 66 shown on the schematic wiring diagram in FIG. 11. A gear 68 is then driven by the power train extending from the brake. The gear 68 drives a gear 70. The gear 70 is made of a magnetic material while the other gears in the film transport mechanism may be made of any suitable material. The gear 70 is made of a magnetic material, such as iron, so that a magnetic sensor element 72, which is placed near the gear teeth, will be activated thereby. The magnetic sensor consists of a coil of wire placed very near the gear teeth, as best shown in FIGS. 9 and 10. A bias magnet 74 is provided in conjunction with the magnetic sensor unit to generate a magnetic field, so that passage of the teeth on the gear 70 will generate electric currents in the magnetic sensor 72.

Referring now to FIG. 11, which is a diagrammatic view of the electronic control system for a photographic printer, according to my invention, a section of film, 12, is shown in relation to the pointer 32 which has been correctly positioned at an edge of a picture frame by manipulation of lever 36 to operate the rack and pinion mechanism. The electronic circuit of the potentiometer 46 is indicated by the dashed lead line in the Figure. The film transport mechanism 18 is diagrammatically shown as 18a and the dashed lead line indicates the electronic circuit associated therewith. The magnetic sensor 72 is indicated by its equivalent electrical circuit 72a and is placed in close proximity to the gear wheel 70, to illustrate the sensing of individual gear teeth.

An initiate circuit 82 is provided which is connected to a counter switch 84 and a film transport control power source 86. The initiate circuit is connected to the printing mechanism by a connection 87 so that the printer will actuate a cycle of film advancement at the completion of a printing cycle. The circuit 82 is connected to a counter switch 84 and a film transport power source 86 for driving coils 62 and 66. The power source 86 may be a transistorized power flip-flop. A control button 80 is provided so that the operator may initiate a cycle of film advancement to bypass an unprintable frame. The counter switch 84 is manually preset to a certain number, as will be explained.

The counter switch 84 is connected by a plurality of wires to a counting register 92. The counting register 92 is in turn connected by a plurality of wires to a logic circuit known in the logic system art as a NAND gate, indicated by reference numeral 94. Also connected to the count register 92 is the input from a gate 96. The gate 96 in turn receives an input from a pulse shaping circuit 98 which is connected with the magnetic sensor coil 72a.

A diode 100 is provided between the pulse shaping circuit 98 and a terminal point 102. A diode 104 is also connected to terminal point 102 and in turn connects with the terminal point 106. The output of the NAND gate is connected to a time delay 108 and to the terminal point 106. In addition, the terminal point 106 is connected to a NAND gate 110.

The output of the time delay 108 is connected to a comparator 112. The output of the comparator forms a second input to gate 110. The output of gate 110 is connected with the film transport power supply 86. A second input to comparator 112 is provided by the variable tap 46a of potentiometer 46. The potentiometer 46 is in a voltage divider comprised of resistor 114 and potentiometer 116 so that variation of the sliding connection 46a of the potentiometer by movement of lever 36 varies the voltage applied to the input of the comparator 112.

In operation, the operator views the position of a particular frame of film 12 in an initial rest position. Among other operations which the operator performs to control the film processing, is that of adjusting lever 36 to place pointer 32 in alignment with the edge of the particular film frame being viewed. This adjustment generates a particular input voltage to comparator 112 by adjustment of the movable tap 46a on the potentiometer. When the printer has completed a printing cycle, it automatically activates the input to the initiate circuit 82. The initiate circuit 82 transmits a control signal to the film transport power supply 86 to energize the clutch solenoid 62 and de-energize the brake solenoid 66 so that the film advancement will begin. The other output of the initiate circuit will set the counting register 92 to the binary complement of the desired tooth count expressed in binary.

As the film advancement commences, the toothed wheel 70 will begin to rotate causing the magnetic sensor 72 to be activated as each tooth passes near the coil 72a. The output of the sensor coil 72a is amplified and otherwise adapted for use in the counting register 82 by the pulse shaping circuit 98. As the gear wheel 70 rotates, pulses corresponding to each gear tooth are transmitted to the count register 92, the number of teeth is counted by appropriate binary logic circuitry of which several systems are well known in the electronic art. A certain number is placed in a binary code which is suitable for use in electronic circuits, in the counter switch 84 prior to commencement of the film processing. The setting of the numbers in the count switch 84 creates current "on" and "off" conditions in the plurality of wires interconnecting the count switch and the count register, corresponding to the binary logic units "one" and "zero" respectively. The number of wires required to interconnect the count register and the count switch, in this embodiment of my invention, is eight to provide the required count capacity. When the initiate circuit 82 has been operated, current flows through the appropriate circuit wires from the count switch 84 to the count register 92, thereby communicating the predetermined count setting.

The count register 92 contains a binary counter which has eight outputs, each of which corresponds to one of the eight wires entering the count switch 84. The output of the counter is continuously compared with the input from the count switch by appropriate logic circuits known in the art. When one of the individual comparison units has an input from the counter which equals the input from the count switch as expressed in "on" or "off" current flow, corresponding to binary logic "one" and "zero" respectively, it in turn has an "on" current output. It will be appreciated that all of the comparison units in the count register will be "on" when the number of gear teeth on gear wheel 70 equals the number set on the count switch 84. In this case, there are eight comparison units corresponding to the eight wires from the count switch and eight inputs from the count unit in the count register. The output of these eight comparison units is the input to the NAND gate 94.

The NAND gate 94 is a logic unit which will have a "zero" output when all inputs are on logic "one" and at no other time. It will now be appreciated that the NAND gate 94 will have a "zero" output occurring only at the time the number of gear teeth sensed equals the predetermined number set on the count switch 84. When this output of the NAND gate occurs at the end of the predetermined film advancement, three events occur simultaneously, the timer circuit 108 begins to produce a steadily increasing output voltage as a function of time, one of two necessary "on" inputs occurs to gate 110, and gate 96 is turned from an "on" position to an "off" position as a result of the interconnection of diodes 104 and 100, so that the count register stops and retains the count it has reached.

As has been previously explained, a certain voltage corresponding to the frame position of a particular frame on film 12 has been placed as an input into the comparator 112. When the steadily increasing voltage output from time delay circuit 108 is identical with that voltage which is placed into circuit 112 from the potentiometer 46, the comparator will produce a positive output, thus giving gate 110 two positive inputs so that it will in turn produce a positive output. When the "on" output from gate 110 is received by the film transport power supply control 86, the film will be at once stopped as a result of the de-energization of the clutch solenoid 62 and the energization of the brake solenoid 66.

It will be understood from the foregoing explanation, that the following steps occur in each film advancement cycle.
1. the operator initiates a film advancement by means of a control mechanism.
2. the advancement of the film commences, and at the same time, the passage of gear teeth associated with the film advancement is measured.
3. when a predetermined number of gear teeth have passed the sensing unit, the counting operation is stopped and a time function begins to occur without stopping the film advancement.
4. when the time function reaches a predetermined value which has been set to correspond to the position of a frame of film prior to advancement thereof, the film advancement is stopped.

It will now be appreciated that I have provided a method and means of accurately positioning film in a film processing mechanism. By providing a film feed control which advances film frame-by-frame for processing in which a sequential cycle of film advancement occurs, I have provided for accurate film frame positioning with adjustment in infinitesimal increments. The first step of the cycle of film advancement advances the film a predetermined distance in discrete steps by counting a certain number of gear teeth. This has the advantage that the film may be advanced a known distance independently of fluctuations in mechanism start-up time.

Then, without stopping, the film is advanced a further distance which is controlled as a function of time by operator adjustment of the control system. At the end of this further advancement time interval, the film is accurately positioned without being dependent on selection of a spacing determined in increments, such as by gear teeth. This film feed control has the advantage that it is simple for the operator to control and avoids the necessity of complicated electronic photocell sensing equipment to automatically position film frame-by-frame. This advantage will be particularly appreciated' when it is considered that the adjustment will generally be made only once for each roll of film which has been exposed in a relatively modern 35mm camera of the type which maintains accurate frame-to-frame spacing.

It will, of course, be understood that various changes may be made in the form, details, arrangement and proportion of the parts without departing from the scope of the invention, which generally stated, consists in the matter set forth in the accompanying claims.

What is claimed is:
1. A film feed control for film in a film processing mechanism comprising,
    initiate means connected to the film processing mechanism for initiating a cycle of film advancement by the mechanism,
    measurement means operatively associated with the film processing mechanism for measuring a predetermined distance of film advancement while the film is in motion in the film processing mechanism,
    position indicating means operatively associated with said film processing mechanism for giving a frame position indicating output signal governed by the position of a frame on said film in the film processing mechanism prior to the advancement thereof,
    a timer connected to said measurement means and said indicating means so that after the predetermined film advancement said timer is activated by said measurement means to determine a time interval of a duration determined in response to the output signal of said position indicating means, and
    terminate means connected to said timer and the film processing mechanism for stopping the advancement of the film at the end of the time interval determined by said timer.
2. The apparatus of claim 1 wherein said measurement means comprises,
    a gear wheel located in said film processing mechanism and having gear teeth spaced equidistant from one another and correspondingly related to increments of film advancement,
    counting means for counting the individual gear teeth on said gear wheel passing a fixed point during film advancement,
    a count switch set for a predetermined number corresponding to the number of gear teeth on said gear wheel required to move past a fixed point to form the predetermined film ad-vancement, and
    count register means for continuously comparing the process of said counting means with the predetermined setting of said count switch and to emit a signal when the number of counted gear teeth equals the predetermined setting.
3. The apparatus of claim 2 and stop means for said counting means to retain the predetermined count after the same has been reached.
4. The apparatus of claim 2 and reset means connected to said initiate means for said counting means to reset same, prior to a new cycle of film advancement.
5. The apparatus of claim 2 and said counting means comprising a magnetic sensor magnetically coupled to said gear wheel at a fixed location to produce electrical impulses in response to the movement of individual gear teeth and an electric counter responsive to the impulses from said sensor.
6. The apparatus of claim 1 with said position indicating means comprising,
    a pointer adapted to be aligned with the edge of a frame of film prior to the advancement thereof,
    a lever connected with said pointer to variably position same, and
    a variable output electrical signal means operably connected with said lever so that the output of said signal means varies with the positioning of said pointer.
7. The apparatus of claim 6 wherein said signal means is a variable potentiometer.
8. The apparatus of claim 1 and a timer activating means responsive to said measurement means to activate said timer after said measurement means has measured a predetermined distance of film advancement.
9. The apparatus of claim 8 wherein said measurement means has a plurality of electrical output circuits all of which will be in an on condition when said predetermined film advancement has occurred and said timer activating means is a NAND gate responsive to all of said output circuits and having an electrical output signal indicative of the occurrence of the predetermined film advancement.

10. The apparatus of claim 1 wherein said timer comprises,
a time delay having an input connected to said measurement means and an output which is activated by the input to produce a time function output signal when said measurement means has measured the predetermined film advancement, and
a comparator having a first input connected to the output of the time delay, a second input connected to said position indicating means to receive the position indicating output signal, and an output connected to said terminate means, said comparator actuating said terminate means when the time function signal equals the position indicating output signal.

11. A method of accurately positioning a photographic film frame for processing in a film processing mechanism often a cycle of film advancement consisting of the steps of,
determining the position of a film frame in the film advancement mechanism prior to the film advancement cycle,
initiating a cycle of film advancement,
advancing the film a first minimum predetermined distance by actual measurement which distance is common to all film frames to be advanced,
advancing the film a second distance without stopping film movement after the first advancement,
determining a time interval for the duration of the second film advancement in response to the position of the film frame as determined, and
terminating the cycle of film advancement at the end of the time interval during which advancement has occurred.

* * * * *